United States Patent
Buck et al.

(10) Patent No.: US 8,194,852 B2
(45) Date of Patent: Jun. 5, 2012

(54) LOW COMPLEXITY ECHO COMPENSATION SYSTEM

(75) Inventors: Markus Buck, Biberach (DE); Tim Haulick, Blaubeuren (DE); Martin Rössler, Ulm (DE); Gerhard Uwe Schmidt, Ulm (DE); Walter Schnug, Memmingen (DE)

(73) Assignee: Nuance Communications, Inc., Burlington, MA (US)

( * ) Notice: Subject to any disclaimer, the term of this patent is extended or adjusted under 35 U.S.C. 154(b) by 1147 days.

(21) Appl. No.: 11/955,862

(22) Filed: Dec. 13, 2007

(65) Prior Publication Data

US 2008/0144848 A1  Jun. 19, 2008

(30) Foreign Application Priority Data

Dec. 18, 2006 (EP) .................................. 06026232

(51) Int. Cl.
*H04M 9/08* (2006.01)
(52) U.S. Cl. ................................. 379/406.14
(58) Field of Classification Search ............. 379/406.14
See application file for complete search history.

(56) References Cited

U.S. PATENT DOCUMENTS

| | | | | |
|---|---|---|---|---|
| 5,136,577 | A * | 8/1992 | Amano et al. ................. | 370/289 |
| 6,049,607 | A | 4/2000 | Marash et al. ................. | 379/410 |
| 6,421,377 | B1 | 7/2002 | Langberg et al. | |
| 6,442,275 | B1 | 8/2002 | Diethorn .................. | 379/406.14 |
| 6,510,225 | B1 | 1/2003 | Robertson et al. ......... | 379/406.1 |
| 6,738,480 | B1 | 5/2004 | Berthault et al. ............... | 381/66 |
| 6,839,426 | B1 | 1/2005 | Kamoi et al. ............ | 379/406.01 |
| 6,853,626 | B1 * | 2/2005 | Farhang-Boroujeny et al. ............. | 370/286 |
| 6,895,095 | B1 | 5/2005 | Thomas ....................... | 381/94.7 |
| 2002/0176585 | A1 | 11/2002 | Egelmeers et al. ......... | 381/71.11 |
| 2003/0021389 | A1 | 1/2003 | Hirai et al. ........................ | 379/3 |
| 2003/0091182 | A1 | 5/2003 | Marchok et al. .......... | 379/392.01 |
| 2003/0185402 | A1 | 10/2003 | Benesty et al. .................. | 381/66 |
| 2004/0018860 | A1 | 1/2004 | Hoshuyama ............... | 455/569.1 |

(Continued)

FOREIGN PATENT DOCUMENTS

EP  1 404 147 A2  3/2004

(Continued)

OTHER PUBLICATIONS

European Search Report for EP 06 02 6232 dated Mar. 22, 2007.
Gänsler, et al., "An Adaptive Nonlinearity Solution to the Uniqueness Problem of Stereophonic Echo Cancellation," *IEEE*, Murray Hill, New Jersey, pp. 1885-1888, 2002.
Schmidt, et al., "Signal Processing for In-Car Communication Systems," *Elsevier*, pp. 1307-1326, 2005.

(Continued)

*Primary Examiner* — Alexander Jamal
(74) *Attorney, Agent, or Firm* — Sunstein Kann Murphy & Timbers LLP

(57) ABSTRACT

An echo reduction system includes a signal analysis filter that converts an input into sub-band signals. A signal down-sampling circuit down-samples the sub-band signals at a first down-sampling rate. An echo analysis filter converts a loudspeaker signal into echo sub-band signal that are further processed by an echo down-sampling circuit. The circuit down-samples the echo sub-band signals at a second down-sampling rate to generate down-sampled echo sub-band signals. An echo compensation filter folds the down-sampled echo sub-band signals with an estimated impulse response of a loudspeaker-room-input system. A second echo down-sampling circuit down-samples the folded down-sampled echo sub-band signals at a third down-sampling rate to generate estimated echo sub-band signals. The first down-sampling rate is equal to the product of the second and third down-sampling rates.

26 Claims, 8 Drawing Sheets

U.S. PATENT DOCUMENTS

| | | | |
|---|---|---|---|
| 2004/0125942 A1 | 7/2004 | Beaucoup et al. | 379/406.01 |
| 2005/0213747 A1 | 9/2005 | Popovich et al. | 379/406.03 |
| 2006/0018459 A1 | 1/2006 | McCree | 379/406.06 |
| 2006/0062380 A1 | 3/2006 | Kim et al. | |
| 2006/0067518 A1 | 3/2006 | Klinke et al. | |
| 2006/0233353 A1 | 10/2006 | Beaucoup et al. | 379/406.01 |
| 2007/0093714 A1 | 4/2007 | Beaucoup | 600/437 |

FOREIGN PATENT DOCUMENTS

| | | |
|---|---|---|
| EP | 1 406 397 A1 | 4/2004 |
| WO | WO93/17510 | 2/1993 |

OTHER PUBLICATIONS

Benesty, et al., "A Hybrid Mono/Stereo Acoustic Echo Canceler," *IEEE Transactions on Speech and Audio Processing*, vol. 6, No. 5, pp. 468-475, Sep. 1988.

Kuo, et al., "Acoustic Noise and Echo Cancellation Microphone System for Videoconferencing," *IEEE Transactions on Consumer Electronics*, No. 4, pp. 1150-1158, Nov. 1995.

Sondhi, et al., "Adaptive Echo Cancellation for Speech Signals," pp. 327-356, 1991.

Storn, R., "Echo Cancellation Techniques for Multimedia Applications—a Survey," pp. 1-53, Nov. 1996.

\* cited by examiner ent Application No. EP 06 02 6232.6, filed Dec. 18,
LOW COMPLEXITY ECHO COMPENSATION SYSTEM

PRIORITY CLAIM

This application claims the benefit of priority from European Pat2006, now European Patent No. 1 936 939 A1, which is incorporated by reference.

BACKGROUND OF THE INVENTION

1. Technical Field

This disclosure relates to echo compensation. In particular, this disclosure relates to an echo compensation system that reduces or eliminates echoes in a communication system.

2. Related Art

Echo reduction or suppression may be used in communication systems, such as hands-free sets and speech recognition systems. Communication systems may include an input device that detects a signal, such as a speech signal. The input device may also detect undesirable signals, such as echoes.

Echoes may occur when sound is reflected from a surface. Such signals may be detected and re-transmitted back to a source. Echoes may be annoying to the user and may result in a communication failure.

SUMMARY

An echo reduction system includes a signal analysis filter that converts an input into sub-band signals. A signal down-sampling circuit down-samples the sub-band signals at a first down-sampling rate. An echo analysis filter converts a loudspeaker signal into echo sub-band signal that are further processed by an echo down-sampling circuit. The circuit down-samples the echo sub-band signals at a second down-sampling rate to generate down-sampled echo sub-band signals. An echo compensation filter folds the down-sampled echo sub-band signals with an estimated impulse response of a loudspeaker-room-input system. A second echo down-sampling circuit down-samples the folded down-sampled echo sub-band signals at a third down-sampling rate to generate estimated echo sub-band signals. The first down-sampling rate is equal to the product of the second and third down-sampling rates.

Other systems, methods, features, and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like-referenced numerals designate corresponding parts throughout the different views.

DETAILED DESCRIPTION OF THE PREFERRED EMBODIMENTS

Figure 1:
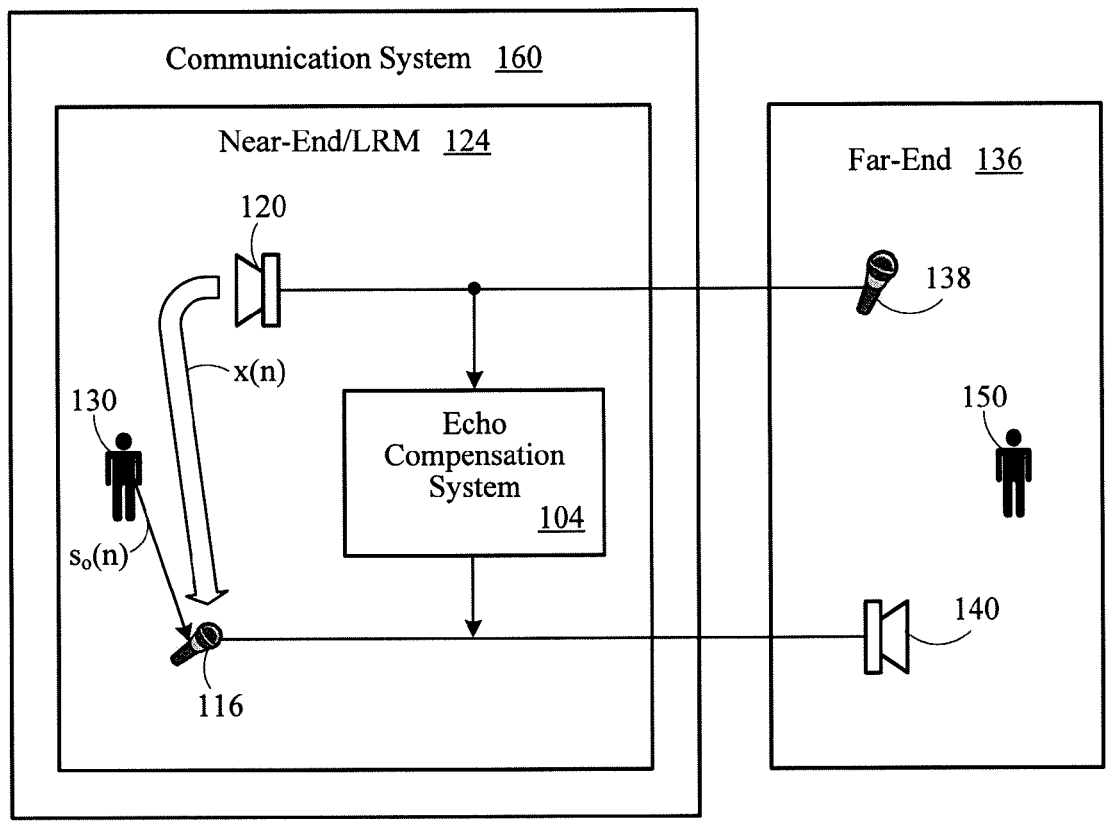
FIG. 1 is an echo compensation system.

FIG. 1 is an echo compensation system 104. A near-end environment may include a near-end input 116, or microphone, and a near-end output or loudspeaker 120, which may form a "loudspeaker-room-input" (LRM) system 124 or "loudspeaker-room-microphone" (LRM) system. The input 116 may convert a speech signal "$s_0(n)$" of a local or near-end speaker 130, and an echo signal "$x_0(n)$" originating from the loudspeaker 120, into analog or digital signals (e.g. microphone signals).

A far-end environment 136 may include a far-end input 138 and a far-end output or loudspeaker 140. The far-end input 138 may detect a speech signal of a far-end speaker 150. Speech from the far-end speaker 150 may be reproduced by the near-end loudspeaker 120, and may be received by the near-end input 116 as reflected sound or an echo signal "$x(n)$." The echo compensation system 104 may reduce or eliminate the echo signal "$x(n)$." The echo compensation system 104 may be part of the near-end environment 124, and may be included in a communication system 160 associated with the near-end environment. A second echo compensation system may be part of the far-end environment 136, and may reduce or eliminate echoes in the far-end environment 136. The communication system 160 may be a hands-free telephone or head-set, wireless telephone, or other communication device. The echo compensation system 104 may be part of a speech recognition system.

Figure 2:
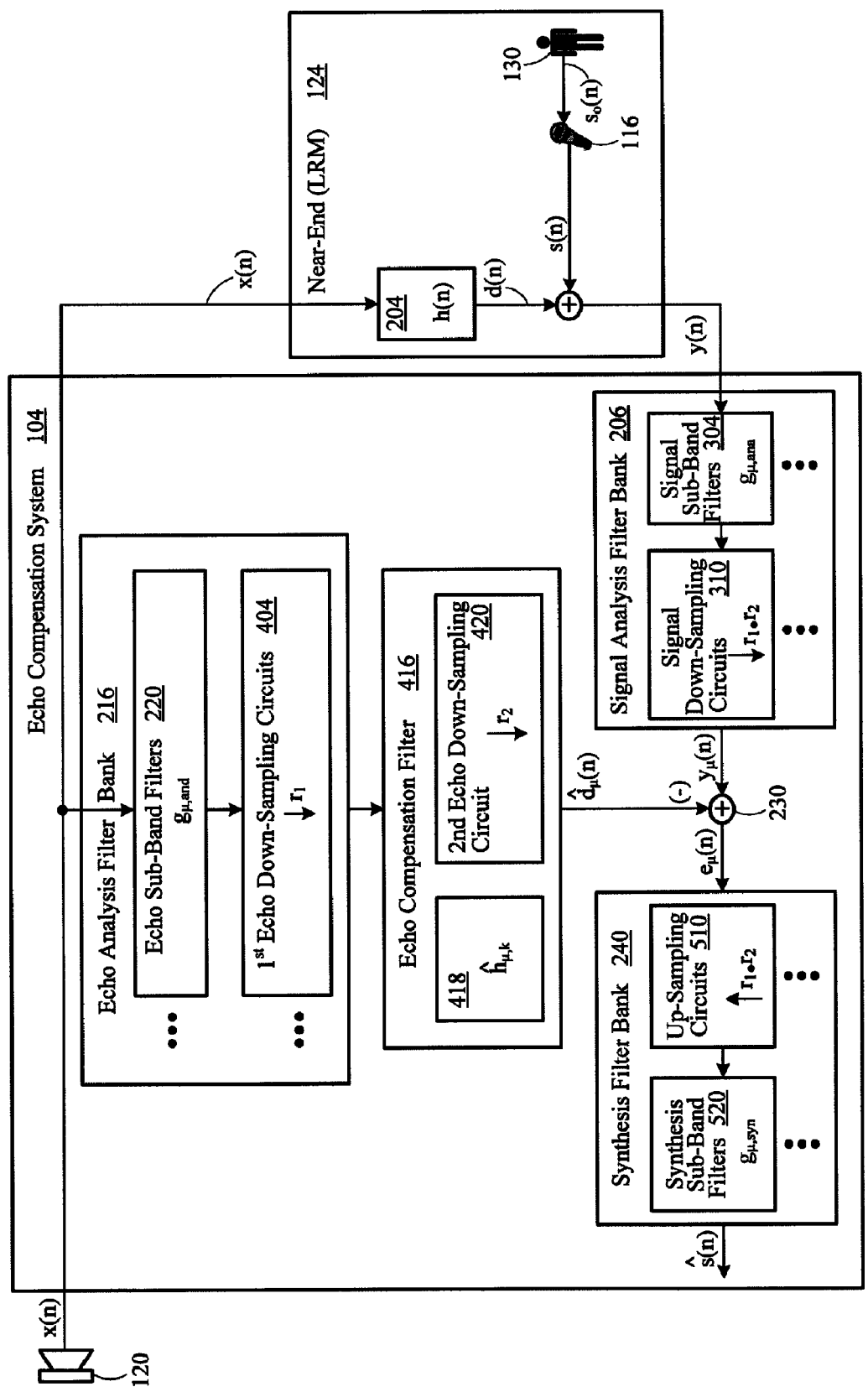
FIG. 2 is an alternative echo compensation system.

FIG. 2 is an alternative echo compensation system 104. In this system a loudspeaker 120 may generate a reference audio signal "$x(n)$," modeled by the impulse response "$h(n)$" 204 of the near-end or LRM environment 124 to generate an echo signal "$d(n)$." The input 116 may convert a speech signal "$s(n)$" that corresponds to speech "$s_0(n)$," into analog or digital signals. The echo signal "$d(n)$" may be combined with the speech signal "$s(n)$" to generate the input or microphone signal "$y(n)$." The output signal "$y(n)$" may be transmitted to the signal analysis filter bank 206 of the echo compensation system 104.

Figure 3:
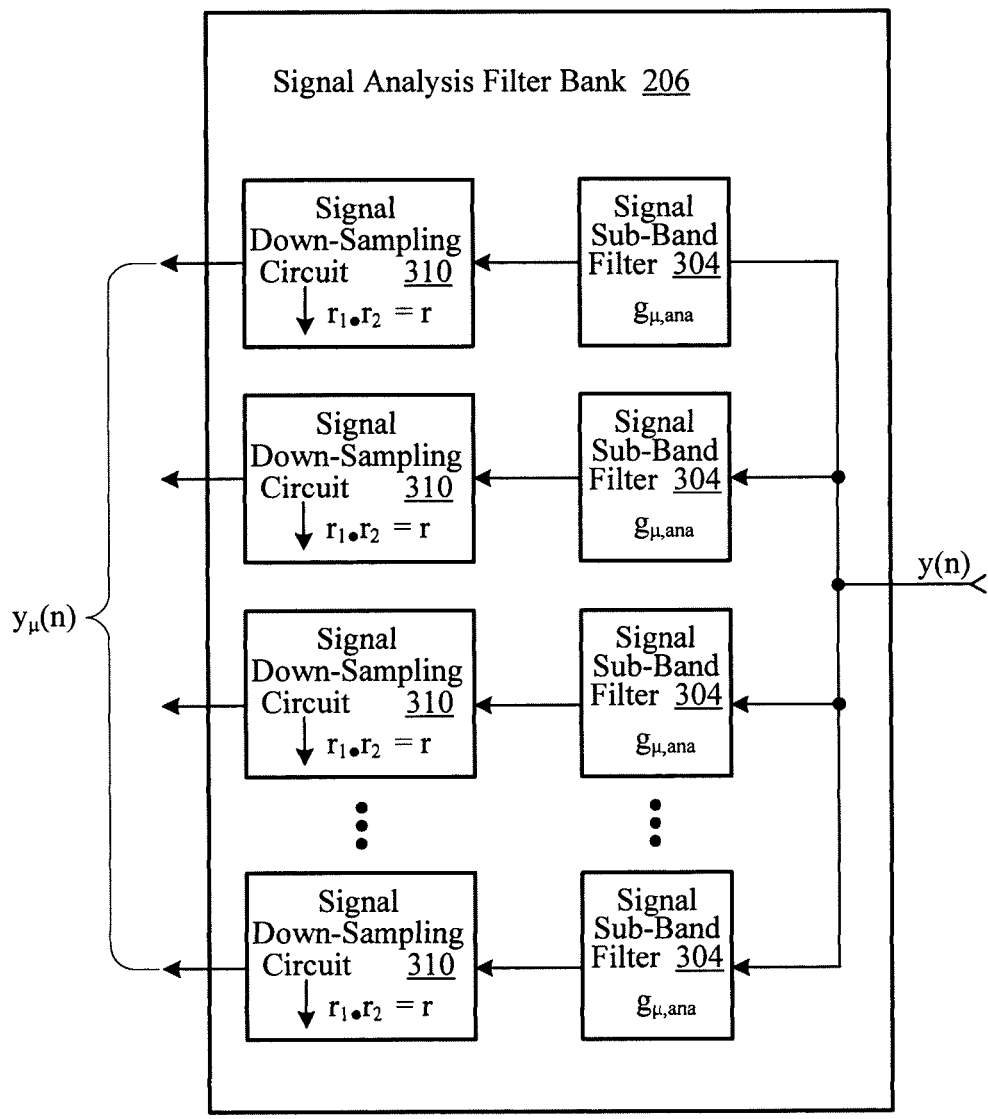
FIG. 3 is a signal analysis filter bank.

FIG. 3 is a signal analysis filter bank 206. The signal analysis filter bank 206 may include a plurality of signal sub-band filters 304 that may divide the output signal "$y(n)$" into a plurality of sub-bands signals. The number of signal sub-band filters 304 may range from $\mu=0$ to $M-1$. The signal sub-band filters 304 may have filter coefficients according to Equation 1 below:

$$g_{\mu,ana} = [g_{\mu,0,ana}, g_{\mu,1,ana}, \ldots, g_{\mu,N_{ana}-1,ana}]^T \quad \text{(Eqn. 1)}$$

where the upper index T may indicate a transposition operation, and $N_{ana}$ may denote the filter length.

A signal down-sampling circuit 310 may communicate with each signal sub-band filter 304, and may down-sample each of the sub-band signals, respectively, by a first down-sampling factor of "$r$." The first down-sampling factor "$r$" may be equal or substantially equal to the product of a second down-sampling factor "$r_1$" and a third down-sampling factor "$r_2$" according to Equation 2 below:

$$r = (r_1)(r_2) \quad \text{(Eqn. 2)}$$

The second and third down-sampling factors "$r_1$" and "$r_2$" may be integer values. The second down-sampling factor "$r_1$" may be equal to about 64, and the third down-sampling factor "$r_2$" may be equal to about 2. Thus, the first down-sampling factor "r" may be equal to about 128, where the number of sub-bands, "M," may be equal to about 256. Other values of the second down-sampling factor "$r_1$" may be used, such as values between about 32 and about 512. Other values for the third down-sampling factor "$r_2$" may be used, such as integer values between about 2 and about 4. When using the higher values for the second and third down-sampling factors, the first down-sampling factor "r" may be equal to about 2048 ($r=r_1 r_2=4\times512$). The sampling rate of the input signal may be equal to about 11025 Hz. The signal down-sampling circuits 310 may generate down-sampled sub-band signals "$y_\mu(n)$."

In some systems, only part of the microphone signal "y(n)" may be divided into sub-bands by the signal analysis filter bank 206. For example, a predetermined frequency range of the output signal "y(n)" may be divided into sub-bands, while a remaining frequency band or frequency region may be analyzed without sub-band division.

The echo compensation system 104 of FIG. 2 may include an echo analysis filter 216 or filter bank. The echo analysis filter 216 may include a plurality of echo sub-band filters 220, which may divide the reference audio signal or echo signal "x(n)" into a plurality of echo sub-bands signals.

Figure 4:
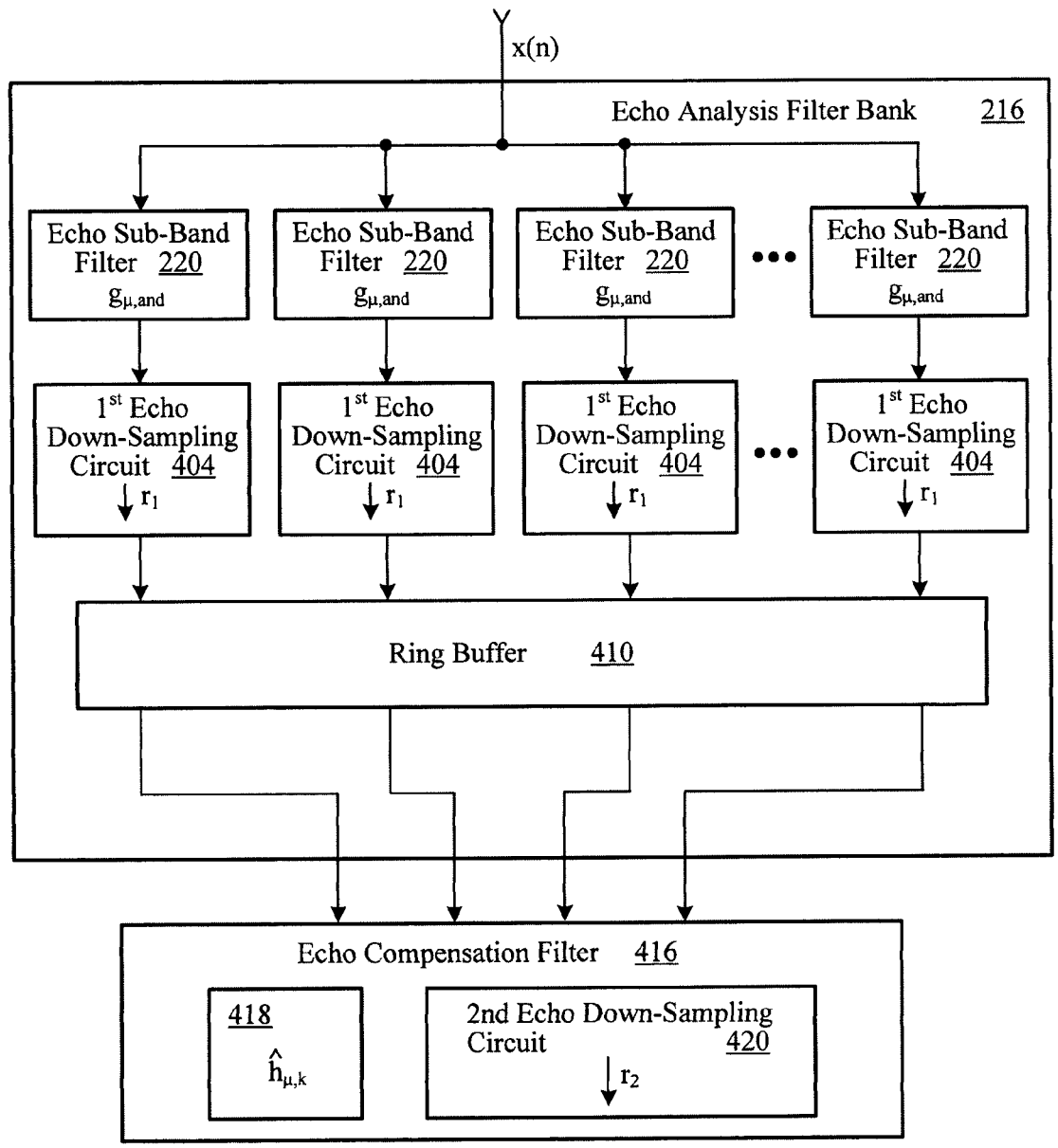
FIG. 4 is an echo analysis filter bank.

FIG. 4 is the echo analysis filter 216. The number of echo sub-band filters 220 may range from $\mu=0$ to M−1. The echo sub-band filters 220 may have filter coefficients "$g_{\mu,and}$" which may be the same or similar to the filter coefficients ($g_{\mu,ana}$) of the signal sub-band filters 304 of the signal analysis filter bank 206.

The echo analysis filter 216 may include a plurality of first echo down-sampling circuits 404. Each first echo down-sampling circuit 404 may communicate with respective echo sub-band filters 220, and may down-sample each of the echo sub-band signals by the second down-sampling factor "$r_1$." The sub-band signals down-sampled by the first echo down-sampling circuit 404 may be stored in a ring buffer 410 or other memory storage.

An echo compensation filter 416 may receive the output of each of the first echo down-sampling circuits 404 (or ring buffer output). The echo compensation filter 416 may have a filter response "$\hat{h}_{\mu,k}(n)$" 418. In some systems, the coefficients of the echo compensation filter 416 may be adapted to perform echo compensation after initial down-sampling by the first echo down-sampling circuits 404 using the first down-sampling factor "$r_1$," where the value of "$r_1$" may be equal to about 64.

Filter coefficients of the echo compensation filter 416 may be adapted for each sub-band using a Normalized Least Mean Square process according to Equation 3 below:

$$\hat{h}(n+1) = \hat{h}(n) + c(n)\frac{x(n)e(n)}{\|x(n)\|^2} \quad \text{(Eqn. 3)}$$

where the signal vector $x(n)=[x(n), x(n-1), \ldots, x(n-N+1)]^T$, where N is the length of the filter $\hat{h}(n)$, and $\|\ \|$ denotes a norm, and
where the error signal $e(n)=y(n)-\hat{d}(n)=y(n)-\hat{h}^T(n) x(n)$. The quantity c(n) may be the adaptation step size.

The echo compensation filter 416 may include a second echo down-sampling circuit 420, which may further down-sample the output of the first echo down-sampling circuits 404 (or ring buffer 410). In some systems, the coefficients of the echo compensation filter 416 may be adapted to perform echo compensation after down-sampling by the second echo down-sampling circuits 420 using the third down-sampling factor "$r_2$." To reduce computational loads, the filter coefficients may be adapted after the signals may be down-sampled using the third down-sampling factor "r".

The echo analysis filter bank 216 of FIG. 2 may output sub-band signals (short-time spectra) in the frequency ($\Omega$) domain according to Equation 4 below:

$$X_\mu(e^{j\Omega}) = \sum_{m=0}^{r_1-1} \times \left(e^{j\left(\frac{\Omega}{r_1}-\frac{2\pi}{r_1}m\right)}\right) G_{\mu,ana}\left(e^{j\left(\frac{\Omega}{r_1}-\frac{2\pi}{r_1}m\right)}\right) \quad \text{(Eqn. 4)}$$

where the echo compensation filter 416 may fold or combine the short-time spectra to generate echo compensated spectra according to Equation 5 below:

$$\hat{D}_\mu(e^{j\Omega}) = X_\mu(e^{j\Omega})\hat{H}_\mu(e^{j\Omega}) \quad \text{(Eqn. 5)}$$

$$= \left[\sum_{m=0}^{r_1-1} \times \left(e^{j\left(\frac{\Omega}{r_1}-\frac{2\pi}{r_1}m\right)}\right) G_{\mu,ana}\left(e^{j\left(\frac{\Omega}{r_1}-\frac{2\pi}{r_1}m\right)}\right)\right]\hat{H}_\mu(e^{j\Omega})$$

where $\hat{H}_\mu(e^{j\Omega})$ may represent the frequency domain filter coefficients of the echo compensation filter 416.

The coefficients $\hat{H}_\mu(e^{j\Omega})$ may represent temporally adapted estimates for the corresponding impulse response of the LRM environment $H_\mu(e^{j\Omega})$, in accordance with the coefficients of h(n) in the time domain.

Aliasing terms of the signal analysis filter bank 206 for $\mu=0$ may be eliminated based on Equations 6 and 7 below:

$$G_{0,ana}\left(e^{j\left(\frac{\Omega}{r_1}-\frac{2\pi}{r_1}m\right)}\right) = \begin{cases} 1, \text{ for } m = 0 \\ 0, \text{ for } m \in \{1, \ldots, r_1-1\} \end{cases} \quad \text{(Eqn. 6)}$$

or $$G_{0,ana}(e^{j\Omega}) = \begin{cases} 1, \text{ if } |\Omega| \leq \frac{2\pi}{M} \\ \text{arbitrary, if } \frac{2\pi}{M} < |\Omega| < \frac{2\pi}{r_1} \\ 0, \text{ if } |\Omega| \geq \frac{2\pi}{r_1} \end{cases} \quad \text{(Eqn. 7)}$$

In Equations 6 and 7, the sub-bands "M" may have the same sub-band width. The signal sub-band filters 304 $G_{\mu,ana}(e^{j\Omega})$ for $\mu=1, \ldots, M-1$, may be derived using Equations 5 and 6 for the sub-band $\mu=0$ by a frequency shift operation.

The echo compensation filter 416 of FIG. 2 may generate estimated sub-band signals "$\hat{d}_\mu(n)$" corresponding to the echo signal "d(n)" captured by the input 116 in the LRM environment 124. A summing circuit 230 may subtract the estimated sub-band signals "$\hat{d}_\mu(n)$" from the down-sampled sub-band signals "$y_\mu(n)$" to generate sub-band error signals "$e_\mu(n)$."

The estimated sub-band signals "$\hat{d}_\mu(n)$" may be generated based on the echo sub-band signals previously stored in the ring buffer 410, which may represent echo sub-band signals sampled at the second down-sampling rate "$r_1$". However, such signals may be processed using the first down-sampling rate "r," which may correspond to the down-sampling rate of the input sub-band signals. Processing the echo signals using the second down-sampling rate "$r_1$" may result in low aliasing terms, while processing the microphone signals using the first, higher down-sampling rate "r," may reduce the computational load. Thus, adapting the filter coefficients of the echo compensation filter 416, may be performed at the first or highest down-sampling rate "r," which may be equal to about 128 when using 256 sub-bands. This may reduce the computational load and may reduce memory requirements. In some systems, the sub-band error signals "$e_\mu(n)$" may be filtered to reduce background noise that may be present in the microphone signal "y(n)."

Figure 5:
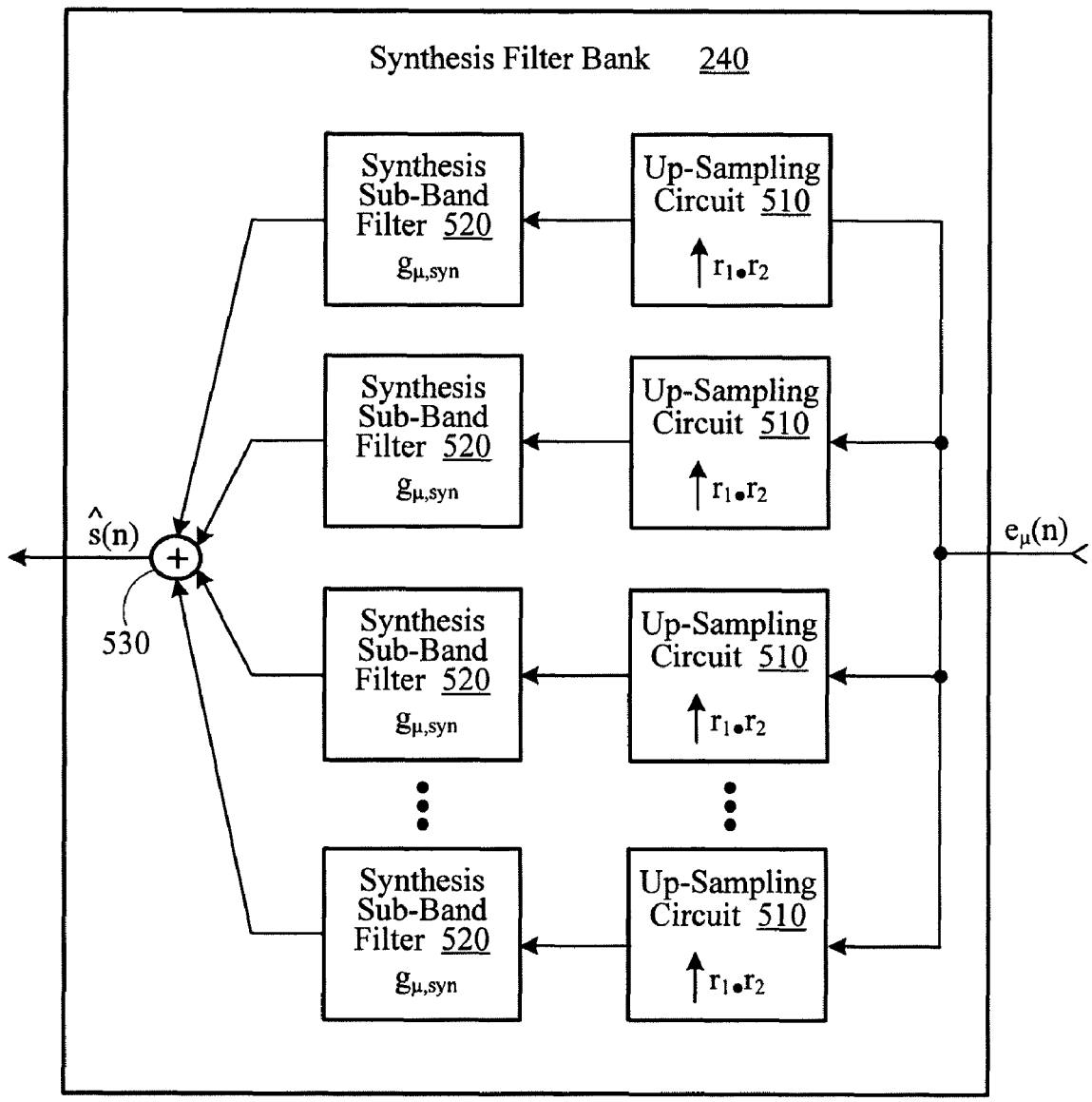
FIG. 5 is synthesis filter bank.

The echo compensation system 104 of FIG. 2 may include a synthesis filter bank 240. FIG. 5 is the synthesis filter bank 240. The synthesis filter bank or synthesis filter 240 may include a plurality of up-sampling circuits 510 and corresponding synthesis sub-band filters 520. Each up-sampling circuit 510 may receive the corresponding sub-band error signals "$e_\mu(n)$." The up-sampling circuits 510 may up-sample the sub-band signals using the factor "r" as an up-sampling factor. The up-sampling factor "r" may be equal to the first down-sampling factor "r," where $r=(r_1)(r_2)$.

Each synthesis sub-band filter 520 may include high-pass filters, band-pass filters, and/or low-pass filters to reduce or eliminate artifacts. A summing circuit 530 may sum the output of each of the synthesis sub-band filters 520 to generate a synthesized speech signal "$\hat{s}(n)$." The synthesized speech signal may have reduced acoustic echo.

The analysis sub-band filters 304, the echo sub-band filters 220, and the synthesis sub-band filters 520 may include square root Hann window filters. Square-root Hann window filters may be efficient and robust in terms of stability. The filter length of the analysis sub-band filters 304, the echo sub-band filters 220, and/or the synthesis sub-band filters 520 may be equal in length. The filter length may be about equal to the number of sub-bands into which the microphone signal and the reference audio signal are divided. Filter banks of "M" parallel filters may include a prototype low-pass filter $h_0(n)$ and modulated band-pass filters $h_i(n)=h_0(n) w_M^{in}$ where $w_M=e^{-j2\pi/M}$. Such filters may be based on discrete Fourier transforms in the form of a polyphase process, which may provide a substantially flat frequency response.

The analysis sub-band filters 304 and the echo sub-band filters 220 may also be Hann window filters (rather than square-root Hann window filters), which may be raised to an exponent corresponding to a first rational number. The first rational number may be, for example, about 0.75. Other values for the first rational number may be used, such as values between about 0.50 to about 0.95. The synthesis sub-band filters 520 may also be Hann window filters (rather than square-root Hann window filters) that may be raised to an exponent corresponding to a second rational number. The second rational number may be, for example, about 0.25, such that the sum of the first and second rational numbers may be about equal to 1. Other values for the second rational number may be used, such as values between about 0.05 to about 0.50. Because the signal analysis filter bank 206 may affect the quality of the enhanced microphone signal more than the synthesis filter bank 240, the first rational number may be larger than the second rational number.

Figure 6:
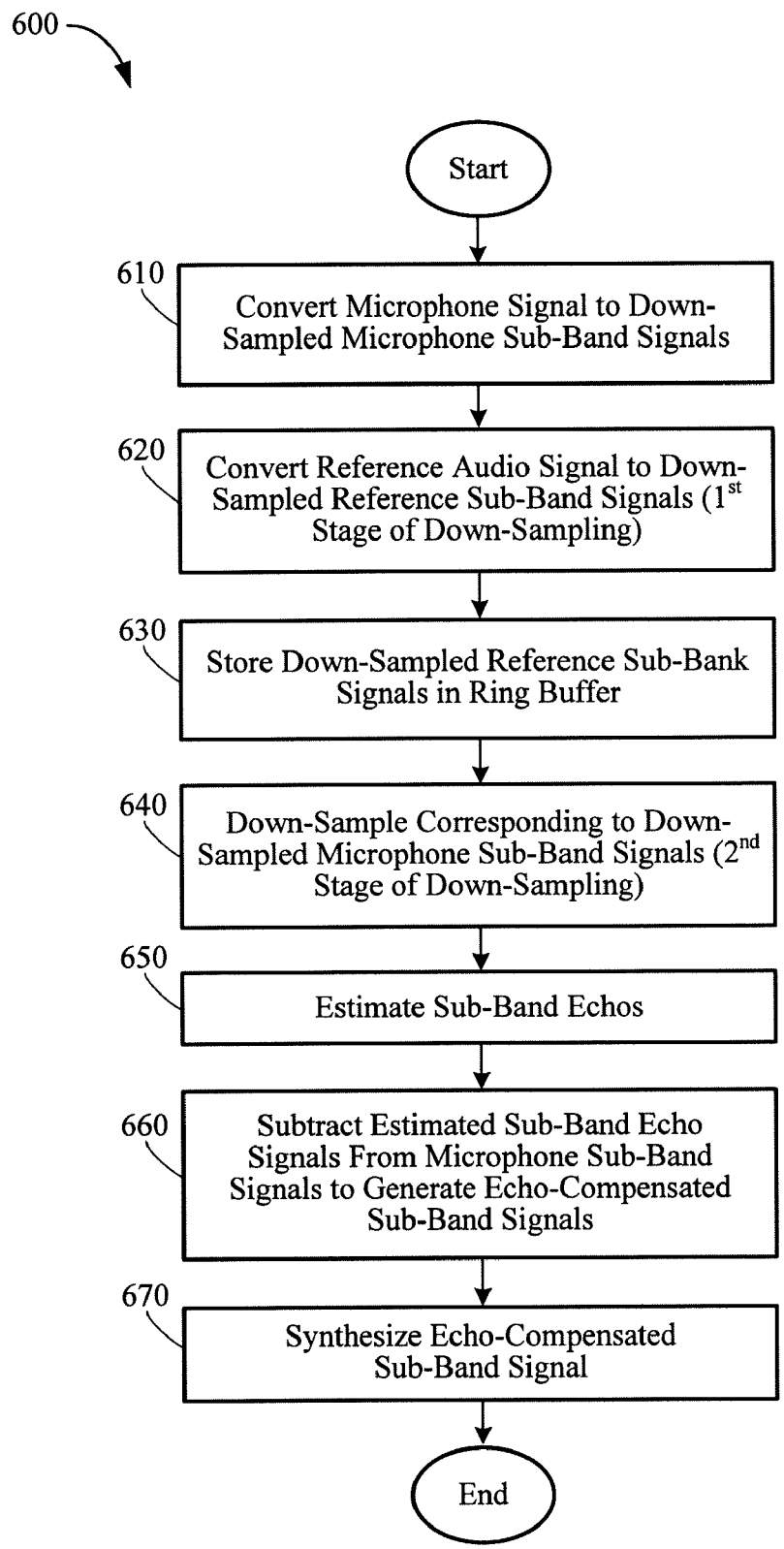
FIG. 6 is a echo compensation process.

FIG. 6 is an echo compensation process. A microphone signal may be divided into a plurality of sub-band microphone signals and may be down-sampled by a predetermined first down-sampling factor "r." (Act 610). A reference audio signal or echo signal may be divided into a plurality of sub-band signals and may be down-sampled by a predetermined second down-sampling factor "$r_1$" (Act 620) to generate first down-sampled sub-band echo signals. The down-sampled sub-band echo signals may be stored in a ring buffer (Act 630). The second down-sampling rate "$r_1$" may be selected to suppress aliasing. The reference audio signal may represent an audio signal received from a remote communication party, which may be output by a loudspeaker at the "near-end."

The first down-sampled sub-band echo signals may be down-sampled a second time using a third down-sampling factor "$r_2$" (Act 640) so that the total amount of down-sampling may be about equal to $r=(r_1)(r_2)$, which may be the same as the down-sampling factor applied to the microphone signal. Filter coefficients of the echo compensation filter 416 may be adapted to generate estimated sub-band signals (Act 650). The estimated sub-band signals may correspond to the echo signal. Filter adaptation may be performed using the first down-sample factor of $r=(r_1)(r_2)$. The estimated sub-band echoes may be subtracted from the input sub-signals (Act 660) to generate echo compensated microphone sub-band signals. The echo compensated microphone sub-band signals may be synthesized and combined (Act 670) to generate an enhanced audio signal for transmission to a remote communication party.

Figure 7:
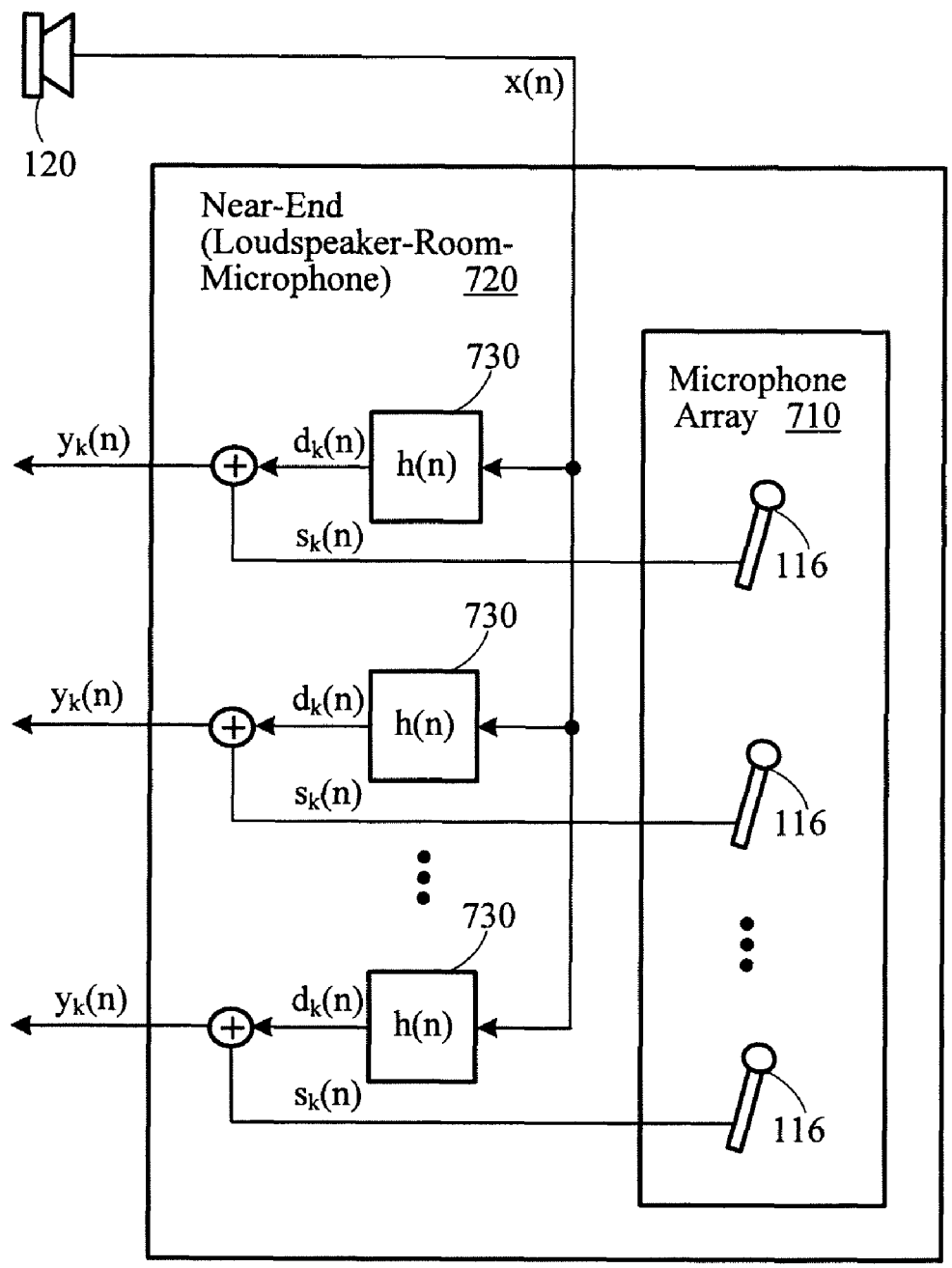
FIG. 7 is an input array.

FIG. 7 is an input array (e.g. a microphone) array 710. The input array 710 may include a plurality of devices that convert sound into analog signals or digital data, and may include directional microphones, which may represent "k" number of microphone "channels." The input array 710 may be arranged in a "loudspeaker-room-microphone (LRM) environment 720, which may represent a near-end system. Each input 116 may generate an operational signal "$s_k(n)$." The loudspeaker 120 may generate the reference audio signal "x(n)," which may be modeled by the impulse response "h(n)" 730 of a near-end or LRM environment 720 to generate (or cause) an echo signal "$d_k(n)$." The echo signal "$d_k(n)$" may be combined with the microphone signal "$s_k(n)$" in the LRM environment 720 to generate the output signal "$y_k(n)$."

Figure 8:
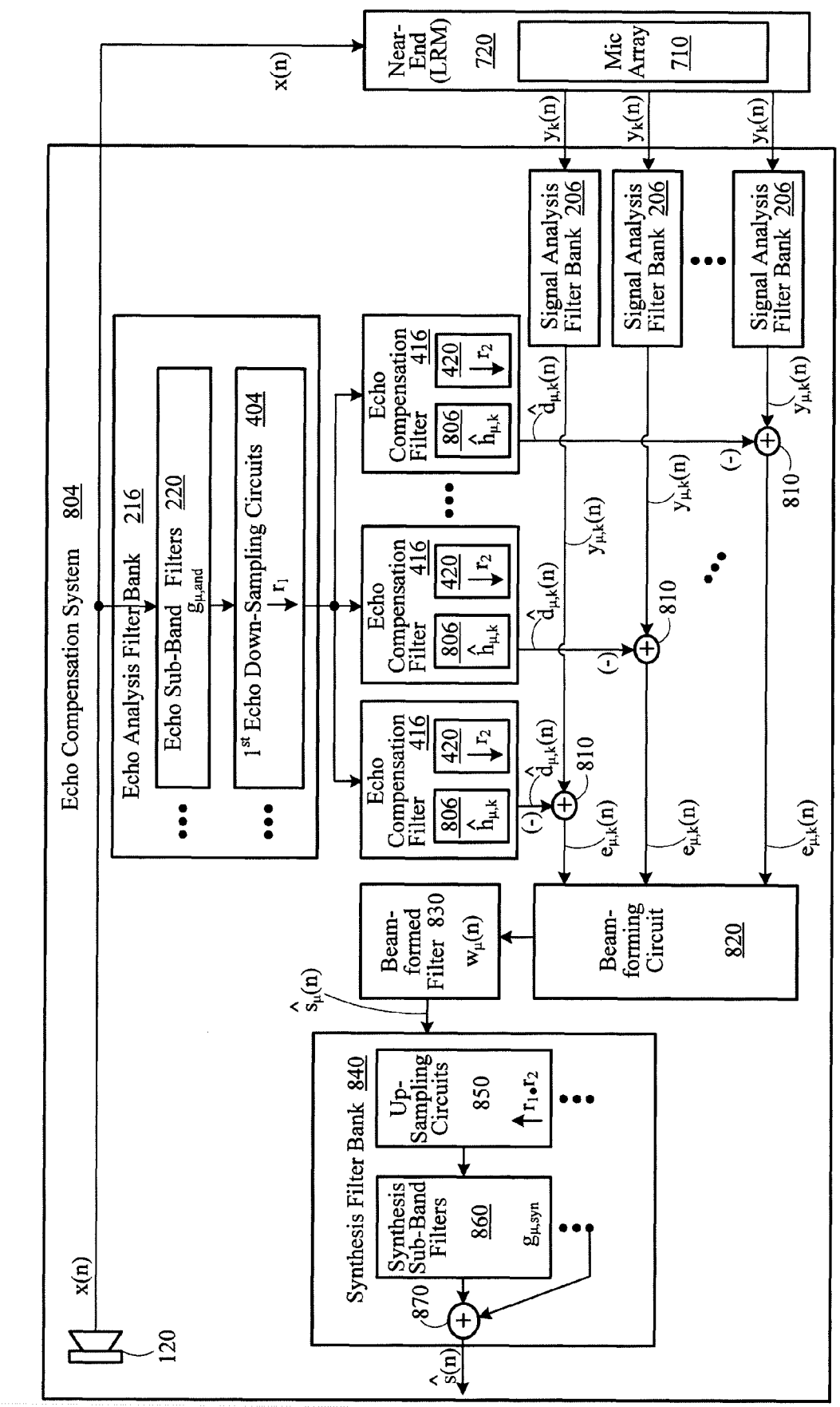
FIG. 8 is an echo compensation system and an input array.

The output signals "$y_k(n)$" may be transmitted to an echo compensation system 804 of FIG. 8. The echo compensation system 804 may include the plurality of signal analysis filter banks 206, which may receive the corresponding microphone signal "$y_k(n)$." Each signal analysis filter bank 206 may be the same or similar to the signal analysis filter bank of FIGS. 2 and 3. Each output signal "$y_k(n)$" may correspond to a specific microphone channel of the input array 710. Each signal analysis filter bank or filter 206 may generate a down-sampled microphone sub-band signal "$y_{\mu,k}(n)$" corresponding to the specific microphone channel "k."

The echo compensation system 804 may include a plurality of the echo compensation filters 416. The number of echo compensation filters 416 may be equal to the number of input channels "k." Each echo compensation filter 416 may be the same or similar to the echo compensation filter of FIG. 2. Each echo compensation filter 416 may receive the output of the echo analysis filter bank 216. The echo analysis filter bank 216 may be the same or similar to the echo analysis filter bank of FIGS. 2 and 4. Each echo compensation filter 416 may generate estimated sub-band signals "$\hat{d}_{\mu,k}(n)$" based on the response "$\hat{h}_{\mu,k}(n)$" 806 of the corresponding echo compensation filter 416.

A plurality of signal combining circuits 810 may subtract the corresponding estimated sub-band signals "$\hat{d}_{\mu,k}(n)$" from the down-sampled sub-band signal "$y_{\mu,k}(n)$" to generate sub-band error signals "$e_{\mu,k}(n)$," which may correspond to the specific input channel "k." The estimated sub-band signals "$\hat{d}_{\mu,k}(n)$" may be generated by folding or combining the echo compensation filter response "$\hat{h}_{\mu,k}(n)$" 806 with the corresponding sub-band signals based on the reference audio signal "x(n)." Adaptation of the echo compensation filter coefficients and the folding of the coefficients with the sub-band reference signals may be performed at a down-sampling rate that may be about equal to the down-sampling rate of the signal analysis filter bank 206.

A beam-forming circuit 820 may receive and process the sub-band error signals "$e_{u,k}(n)$." The beam-forming circuit 820 may be adaptive or may be non-adaptive. The beam-forming circuit 820 may be a "delay and sum" beam-forming circuit. The beam-forming circuit 820 may process the signals using a process described by "Optimum Array Processing, Part IV of Detection, Estimation, and Modulation Theory," by H. L. van Trees, Wiley & Sons, New York 2002, which is incorporated by reference.

The beam-forming circuit 820 may be a "delay-and-sum" beam-former or it may be a Generalized Sidelobe Canceller. The Generalized Sidelobe Canceller may include a first or lower adaptive signal processing path with a blocking matrix and an adaptive noise-canceling circuit. The Generalized Sidelobe Canceller may include a second or upper non-adaptive signal processing path with a fixed beam-former. The beam-forming circuit 820 may process the signals using a process described by "An alternative approach to linearly constrained adaptive beamforming," by Griffiths, IEEE Transactions on Antennas and Propagation, vol. 30, p. 27, 1982, which is incorporated by reference.

The beam-forming circuit 820 may combine the sub-band error signals "$e_{u,k}(n)$" for each of the "k" input channels to generate beam-formed sub-band signals. A beam-formed filter circuit 830 may receive the beam-formed sub-band signals and may suppress a residual echo to enhance the quality of the beam-formed sub-band signals. The beam-formed filter circuit 830 may include a Wiener filter. The Weiner filter may reduce background noise in the frequency domain according to Equation 8 below:

$$W(e^{j\Omega},n)=1-\hat{S}_{nn}(e^{j\Omega},n)/\hat{S}_{ee}(e^{j\Omega},n) \quad \text{(Eqn. 8)}$$

where $\hat{S}_{nn}(e^{j\Omega}, n)$ may denote an estimated short-time power density of the background noise, and
where $\hat{S}_{ee}(e^{j\Omega}, n)$ may denote a short-time power density of the full-band error signal.

The beam-formed filter circuit 830 may generate enhanced sub-band signals "$\hat{s}_\mu(n)$." A synthesis filter bank 840 may receive the enhanced sub-band signals "$\hat{s}_\mu(n)$." The synthesis filter bank 840 may include a plurality of up-sampling circuits 850 and corresponding synthesis sub-band filters 860. Each up-sampling circuit 850 may receive the corresponding enhanced sub-band signals "$\hat{s}_\mu(n)$." The up-sampling circuits 850 may up-sample the sub-band signals using the factor "r" as the up-sampling factor. The up-sampling factor "r" may be equal to the first down-sampling factor "r," where $r=(r_1)(r_2)$. Each synthesis sub-band filter 860 may include high-pass filters, band-pass filters, and/or low-pass filters to reduce or eliminate artifacts. A summing circuit 870 may sum the output of each of the synthesis sub-band filters 860 to generate a synthesized speech signal "$\hat{s}(n)$."

The logic, circuitry, and processing described above may be encoded in a computer-readable medium such as a CDROM, disk, flash memory, RAM or ROM, an electromagnetic signal, or other machine-readable medium as instructions for execution by a processor. Alternatively or additionally, the logic may be implemented as analog or digital logic using hardware, such as one or more integrated circuits (including amplifiers, adders, delays, and filters), or one or more processors executing amplification, adding, delaying, and filtering instructions; or in software in an application programming interface (API) or in a Dynamic Link Library (DLL), functions available in a shared memory or defined as local or remote procedure calls; or as a combination of hardware and software.

The logic may be represented in (e.g., stored on or in) a computer-readable medium, machine-readable medium, propagated-signal medium, and/or signal-bearing medium. The media may comprise any device that contains, stores, communicates, propagates, or transports executable instructions for use by or in connection with an instruction executable system, apparatus, or device. The machine-readable medium may selectively be, but is not limited to, an electronic, magnetic, optical, electromagnetic, or infrared signal or a semiconductor system, apparatus, device, or propagation medium. A non-exhaustive list of examples of a machine-readable medium includes: a magnetic or optical disk, a volatile memory such as a Random Access Memory "RAM," a Read-Only Memory "ROM," an Erasable Programmable Read-Only Memory (i.e., EPROM) or Flash memory, or an optical fiber. A machine-readable medium may also include a tangible medium upon which executable instructions are printed, as the logic may be electronically stored as an image or in another format (e.g., through an optical scan), then compiled, and/or interpreted or otherwise processed. The processed medium may then be stored in a computer and/or machine memory.

The systems may include additional or different logic and may be implemented in many different ways. A controller may be implemented as a microprocessor, microcontroller, application specific integrated circuit (ASIC), discrete logic, or a combination of other types of circuits or logic. Similarly, memories may be DRAM, SRAM, Flash, or other types of memory. Parameters (e.g., conditions and thresholds) and other data structures may be separately stored and managed, may be incorporated into a single memory or database, or may be logically and physically organized in many different ways. Programs and instruction sets may be parts of a single program, separate programs, or distributed across several memories and processors. The systems may be included in a wide variety of electronic devices, including a cellular phone, a headset, a hands-free set, a speakerphone, communication interface, or an infotainment system.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A method for reducing echoes in an input signal containing an audio signal and an echo signal, the echo signal generated by a loudspeaker signal in a loudspeaker-room-microphone system, the method comprising:
   converting a portion of the input signal to microphone sub-band signals;
   down-sampling the microphone sub-band signals by a first down-sampling rate;
   converting the loudspeaker signal to echo sub-band signals;
   down-sampling the echo sub-band signals by a second down-sampling rate to generate down-sampled echo sub-band signals;
   folding the down-sampled echo sub-band signals with an estimated impulse response of the loudspeaker-room-microphone system to generate the folded down-sampled echo sub-band signals;
   down-sampling the folded down-sampled echo sub-band signals by a third down-sampling rate to generate estimated echo sub-band signals, where the first down-sampling rate is equal to the product of the second and third down-sampling rates
   subtracting for each sub-band, the estimated echo sub-band signal from the corresponding microphone sub-band signal to obtain error sub-band signals; and
   up-sampling and synthesizing the error sub-band signals to generate an echo compensated audio signal.

2. The method according to claim 1, where generating the estimated echo sub-band signal comprises adapting filter coefficients of an echo compensation filter based on the stored down-sampled echo sub-band signals at a rate equal to the first down-sampling rate.

3. The method according to claim 2, where the filter coefficients are adapted using a normalized least mean square process.

4. The method according to claim 1, where the second down-sampling rate is equal to an integer value ranging from 32 to 128.

5. The method according to claim 1, where the third down-sampling rate is equal to an integer value ranging from 2 to 4.

6. The method according to claim 1, where the first down-sampling rate is equal to the product of the second down-sampling rate and the third down-sampling rate.

7. The method according to claim 1, where converting the microphone signal to microphone sub-band signals comprises filtering the signals using a bank of square-root Hann window filters.

8. The method according to claim 1, where converting the loudspeaker signal to echo sub-band signals comprises filtering the signals using a bank of square-root Hann window filters.

9. The method according to claim 1, where synthesizing the error sub-band signals comprises filtering the signals using a bank of square-root Hann window filters.

10. The method according to claim 1, where the error sub-band signals are up-sampled at rate equal to the first down-sampling rate.

11. The method according to claim 1, where converting the microphone signal to microphone sub-band signals comprises filtering the signals using a bank of Hann window filters, each Hann window filter raised to the power of a first rational number, and where synthesizing the error sub-band signals comprises filtering the signals using a bank of Hann window filters, each Hann window filter raised to the power of a second rational number.

12. The method according to claim 11, where the sum of the first and second rational numbers is equal to 1.

13. The method according to claim 12, where the first rational number ranges from 0.50 to 0.95 and the second rational number ranges from 0.05 to 0.50.

14. A method for reducing echoes in a plurality of input signals, each in put signal corresponding to a channel, and containing an audio signal and an echo signal, the echo signals generated by a loudspeaker signal in a loudspeaker-room-microphone system, the method comprising:
converting at least a portion of each input signal to respective microphone sub-band signals;
down-sampling the microphone sub-band signals for each microphone by a first down-sampling rate;
converting the loudspeaker signal to echo sub-band signals for each channel;
down-sampling the echo sub-band signals for each channel by a second down-sampling rate to generate down-sampled echo sub-band signals, the second down-sampling rate less than the first down-sampling rate;
folding the down-sampled echo sub-band signals for each channel with an estimated impulse response of the loudspeaker-room-microphone system to generate the folded down-sampled echo sub-band signals;
down-sampling the folded down-sampled echo sub-band signals for each channel by a third down-sampling rate to generate estimated echo sub-band signals, where the first down-sampling rate is equal to the product of the second and third down-sampling rates;

for each sub-band within each channel, subtracting the estimated echo sub-band signal from the corresponding microphone sub-band signal to obtain error sub-band signals for each channel;
beamforming the error sub-band signals for each channel to generate beamformed error sub-band signals; and
up-sampling and synthesizing the error sub-band signals to generate an echo compensated audio signal.

15. An echo reduction system for reducing echoes in a microphone signal containing an audio signal and an echo signal, the echo signal generated by a loudspeaker signal in a loudspeaker-room-microphone system, the system comprising:
a signal analysis filter bank configured to convert at least a portion of a microphone signal to microphone sub-band signals;
a signal down-sampling circuit configured to down-sample the microphone sub-band signals by a first down-sampling rate
an echo analysis filter bank configured to convert a loudspeaker signal to a plurality of echo sub-band signals;
a first echo down-sampling circuit configured to down-sample the echo sub-band signals by a second down-sampling rate to generate down-sampled echo sub-band signals, the second down-sampling rate less than the first down-sampling rate;
an echo compensation filter configured to fold the down-sampled echo sub-band signals with an estimated impulse response of the loudspeaker-mom-microphone system to generate the folded down-sampled echo sub-band signals; and
a second echo down-sampling circuit configured to down-sample the folded down-sampled echo sub-band signals by a third down-sampling rate to generate estimated echo sub-band signals, where the first down-sampling rate is equal to the product of the second and third down-sampling rates.

16. The system of claim 15 further comprising:
a combining circuit configured to subtract for each sub-band, the estimated echo sub-band signal from the corresponding microphone sub-band signal to obtain error sub-band signals;
an up-sampling circuit configured to up-sample the error sub-band signals by an up-sampling rate equal to the first down-sampling rate; and
a synthesis filter bank configured to synthesize the up-sampled error sub-band signals to generate an echo compensated audio signal.

17. The system of claim 15 further comprising at least one of a residual echo suppression filter and a noise reduction filter configured to filter the error sub-band signals.

18. The system of claim 15, where the signal analysis filter bank, comprises a plurality of square-root Hann window filters.

19. The system of claim 15, where the echo analysis filter bank comprises a plurality of square-root Hann window filters.

20. The system of claim 16, where the synthesis filter bank comprises a plurality of square-root Hann window filters.

21. The system of claim 16, where the up-sampling circuit up-samples the error sub-band signals at rate equal to the first down-sampling rate.

22. The system of claim 16, where the signal analysis filter bank comprises a plurality of Hann window filters, each Hann window filter raised to the power of a first rational number, and the echo analysis filter bank comprises a plurality of Hann window filters, each Hann window filter raised to the power of a second rational number.

23. The system of claim 22, where the sum of the first and second rational numbers is equal to 1.

24. The method according to claim 23, where the first rational number ranges from 0.50 to 0.95 and the second rational number ranges from 0.05 to 0.50.

25. The system of claim 15, where the signal analysis filter bank, comprises a plurality of window-based filters.

26. The system of claim 25, where the plurality of window-based filters provides an output value of zero when an input value is outside a pre-defined interval.

* * * * *